(12) United States Patent
McCullagh et al.

(10) Patent No.: US 12,351,426 B2
(45) Date of Patent: Jul. 8, 2025

(54) ROLLER APPARATUS FOR A COVER AND METHOD OF USE THEREOF

(71) Applicant: Tim McCullagh, Stokesley (GB)

(72) Inventors: Tim McCullagh, Stokesley (GB); John McCullagh, Stokesley (GB); Rolf McCullagh, Stokesley (GB)

(73) Assignee: Tim McCullagh, Stokesley (GB)

( * ) Notice: Subject to any disclaimer, the term of this patent is extended or adjusted under 35 U.S.C. 154(b) by 659 days.

(21) Appl. No.: 17/593,919

(22) PCT Filed: Mar. 23, 2020

(86) PCT No.: PCT/GB2020/050770
§ 371 (c)(1),
(2) Date: Sep. 28, 2021

(87) PCT Pub. No.: WO2020/201712
PCT Pub. Date: Oct. 8, 2020

(65) Prior Publication Data
US 2022/0041403 A1 Feb. 10, 2022

(30) Foreign Application Priority Data

Mar. 29, 2019 (GB) ..................... 1904421

(51) Int. Cl.
*B65H 75/44* (2006.01)
*A63C 19/12* (2006.01)
*B65H 75/40* (2006.01)

(52) U.S. Cl.
CPC ......... *B65H 75/4486* (2013.01); *A63C 19/12* (2013.01); *B65H 75/40* (2013.01);
(Continued)

(58) Field of Classification Search
CPC ............... E06B 9/72; E06B 2009/6818; B65H 75/4486; B65H 75/40; E04H 4/101; E04H 4/082; E04H 4/10; A01G 13/0287
See application file for complete search history.

(56) References Cited

U.S. PATENT DOCUMENTS 3,885,255 A * 5/1975 Vorbach .................. E04H 4/101
4/502
5,890,240 A 4/1999 Graham
(Continued)

FOREIGN PATENT DOCUMENTS

FR 2999629 A1 * 6/2014 ............. E04H 4/101
FR 3037349 A1 12/2016
(Continued)

OTHER PUBLICATIONS

FR 2999629 machine translation (Year: 2014).*
(Continued)

*Primary Examiner* — Abe Massad
(74) *Attorney, Agent, or Firm* — McKee, Voorhees & Sease, PLC (57) ABSTRACT

A roller apparatus (102) is provided including roller means (104), drive means (110) for driving rotation of the roller means in use, and an electrical power source for providing electrical power to the drive means in use. The electrical power source is provided by one or more batteries (112) located internally of the roller means.

15 Claims, 7 Drawing Sheets

(52) U.S. Cl.
CPC ...... *A63C 2203/12* (2013.01); *B65H 2403/90* (2013.01); *B65H 2408/20* (2013.01); *B65H 2701/1922* (2013.01)

(56) References Cited

U.S. PATENT DOCUMENTS

| | | | | |
|---|---|---|---|---|
| 8,299,734 | B2 * | 10/2012 | Mullet | E06B 9/72 |
| | | | | 160/310 |
| 9,284,741 | B2 * | 3/2016 | Scheps | E04H 4/101 |
| 2011/0203748 | A1 | 8/2011 | Mullet et al. | |
| 2018/0187440 | A1 * | 7/2018 | Vervoort | E04H 4/082 |
| 2019/0100961 | A1 * | 4/2019 | Kutell | E06B 9/50 |
| 2020/0018118 | A1 * | 1/2020 | Geiger | A47H 1/13 |

FOREIGN PATENT DOCUMENTS

| | | | | | |
|---|---|---|---|---|---|
| FR | | 3090024 A1 * | 6/2020 | | |
| FR | | 3084900 B1 * | 8/2020 | ............. | E04H 4/082 |

OTHER PUBLICATIONS

International Bureau in connection with PCT/GB2020/050770 filed Mar. 23, 2020, "International Preliminary Report on Patentability", 9 pages, mailed Oct. 14, 2021.

* cited by examiner

ROLLER APPARATUS FOR A COVER AND METHOD OF USE THEREOF

CROSS REFERENCE TO RELATED APPLICATIONS

This is a U.S. national phase application claiming priority to PCT/GB2020/050770, filed Mar. 23, 2020, which claims priority to British application No. 1904421.3, filed Mar. 29, 2019, the entire contents of which are hereby incorporated by reference in their entirety.

This invention relates to roller apparatus for a cover and a method of use thereof.

Although the following description refers almost exclusively to roller apparatus for use with a ground cover to selectively cover a specific ground area, sports pitch, equestrian ring and/or the like, it will be appreciated by persons skilled in the art that the roller apparatus of the present invention could be used for the purposes of rolling in and/or out any flexible material over any required surface in use.

An example of a known roller system includes an elongate roller member 2 around which a cover member 4 can be automatically wound and unwound in use to allow selective coverage of a ground area in use, as shown in FIGS. 1a-1d. The elongate roller member 2 includes an outer metal roller member and an inner roller member 5 that is joined along its length using a series of stub shaft joiners, fixings, stiffeners 7 and spacer members. The inner roller member 5 is included for the provision of strength and rigidity to the outer roller member. A reaction arm 6 is provided at each end of the roller member 2. A wheel 8 is provided at the end of the reaction arm 6 opposite to the end that is joined to the roller member 2. The wheel 8 moves along the ground surface during rotation of the roller member 2 and winding and unwinding of the cover member from the roller member 2. Rotatable movement of the roller to allow the winding and unwinding of the cover member is driven by an external mains electrical power supply. A combined three phase electrically powered motor 10 and gearbox 12 is provided within a housing 14 and located at each end of the roller member for driving rotation of a rotatable shaft 16 that passes internally along the entire length of the roller 2 between the two ends thereof. The housing 14 is retained in place within the inner roller member 5 via support sleeves 18, 20 that are fixed thereto. A bearing 22 transfers rotatable movement of the roller 2 to the reaction arm 8.

Problems associated with the known roller system is that since it is powered by an external mains electrical power supply, the system can only be utilised in areas where there is a mains electrical supply. It cannot be used in more remote areas where a mains electrical supply is not available. In addition, 415V trailing electrical cables have to be provided from an electrical control panel to the roller system. The cables are dragged along by the roller member 2 as it moves along the ground surface in use to wind and unwind the cover member therefrom. These moving electrical cables present both a trip hazard and present an electrical safety issue. In addition, the trailing electrical cables often interfere with the win; ding/unwinding of the cover on the roller and can result in damage to the cover and/or tyre of the reaction arm. Since electrical cables protrude from the roller member, it is difficult to seal the internal drive mechanism within the roller member, thereby allowing water to ingress over time that damages the internal components of the roller member. Due to the safety issues associated with having trailing electrical cables during operation of the roller system, it requires one or more operators to be present on site during use of the roller system. This is both time consuming and expensive.

The user of the roller system has to have a three phase power supply put in at the location adjacent the ground area to be covered by the roller system. It also requires a large control panel to be provided adjacent the roller system. Both of these features increase the expense, complexity and maintenance of the system to a user.

In order to allow rotatable movement to be transmitted from the gearbox along the entire length of the roller member 2, the rotatable shaft 16 has to be very sturdy and heavy so as not to bend. The inner and outer roller members also have to be both large, heavy and strong to prevent bending of the roller member 2 in use. This results in the known roller system being large, cumbersome and expensive to produce.

The location of the gear box within the roller member 2 to drive rotation of a rotatable sleeve or bearing that in turn drives rotation of the roller member, results in both and inner and outer roller member to being provided sufficiently strong and rigid to allow being driven without bending in use. This also increases the size, weight and cost of the apparatus.

It is therefore an aim of the present invention to provide roller apparatus and/or a roller operated cover system that overcomes the abovementioned problems.

It is a further aim of the present invention to provide a method of using roller apparatus and/or a method of using a roller operated cover system that overcomes the abovementioned problems.

According to a first aspect of the present invention there is provided roller apparatus, said roller apparatus including roller means, drive means for driving rotation of the roller means in use, and an electrical power source for providing electrical power to the drive means in use, and wherein said electrical power source is provided by one or more batteries located internally of the roller means.

Thus, the present invention provides roller apparatus with an internal electrical power supply. This overcomes many of the abovementioned problems associated with the prior art roller system that requires an external electrical power supply. The present invention is therefore a battery powered roller apparatus.

Preferably the one or more batteries are one or more rechargeable batteries.

Preferably the number, size, position and/or power of the batteries is adjustable according to the size of the ground area being covered by the cover that is to be deployed with the roller apparatus in use, the type of ground on which the roller apparatus is to operate in use, the type of battery being used and/or the like.

In one example, a series of batteries or rechargeable batteries are provided, such as for example, four rechargeable batteries are provided. In one example each battery provides a 6 Volt supply, thereby providing an overall power supply of 24V to the drive means in use. Alternatively, in another example the overall power supply is 24V or 48V supplied by any number of batteries.

Preferably the one or more batteries are lithium batteries, lead acid batteries and/or the like.

Preferably the roller apparatus includes recharging connection means and/or a recharging unit which is/are connected to, connectable to or associated with the one or more rechargeable batteries to allow the batteries to be recharged via a further electrical power source, and preferably an external power source, separate to or provided on the roller apparatus in use.

In one embodiment the further electrical power source can be a mains electrical power source, hydraulic generated electrical power source, a generator electrical power source, a solar electrical power supply, a wind generated electrical power supply and/or the like.

In one embodiment a power source or power generating means is provided on or associated with the roller apparatus, such as for example a wind turbine or generator, solar powered means and/or the like. The power source or power generating means can be used to provide a full electrical charge for the rechargeable batteries or can be used to partially charge the rechargeable batteries as required.

In one embodiment the one or more batteries are provided at, immediately adjacent or adjacent a first end of the roller means, and the drive mean are provided at, immediately adjacent or adjacent a second end of the roller means.

In one embodiment the one or more batteries are provided at, immediately adjacent or adjacent to a first end of the roller means.

Preferably the drive means are provided at, immediately adjacent or adjacent a second end of the roller means.

Preferably the one or more batteries are provided at or adjacent an end of the roller means opposite to an end of the roller means housing the drive means. This allows the batteries to be easily accessible for replacement and/or repair without obstruction from the drive means. It also allows the weight of components within the roller means to be evenly distributed along the length of the roller means. However, it will be appreciated that the one or more batteries can be located at any position along the length of the roller means, such as for example, centrally, adjacent to the drive means and/or the like.

In one embodiment the one or more batteries and drive means are located within the roller means so as to balance or substantially balance the weight; or distribute or substantially distribute the weight evenly, within the roller means in use. For example, the drive means could be provided at one end of the roller means and the one or more batteries can be provided immediately adjacent, a spaced distance from the drive means within the roller means but within the same half of the roller means as the drive means, centrally or substantially centrally of the roller means, a distance greater than half of the length of the roller means but not at the opposite end of the roller means to the drive means, and/or the like.

Preferably the one or more batteries are connectable to or connected to a motor or the drive means via one or more electrical cables that extend internally of the roller means between the batteries and the motor or drive means. The cables can extend between opposite ends of the roller means or can extend the distance between the drive means and the batteries which, in some examples may not be a great distance.

Preferably the drive means includes a Direct Current (DC) electric motor or Alternating Current (AC) electric motor.

Preferably an inverter or inverter means is provided with or associated with the one or more batteries for converting Direct Current (DC) electrical power supplied by the batteries to Alternating Current (AC) electrical power for use by the drive means, for converting DC electrical power to AC electrical power and/or the like.

Preferably the one or more batteries are removably locatable in a battery housing, a frame and/or the roller means in use. Preferably the battery housing and/or frame is typically separate to the external walls of the battery itself.

Preferably the battery housing and/or frame is movably mounted within an internal cavity of the roller means in use.

Preferably the battery housing and/or frame is slidably mountable within an internal cavity of the roller means in use.

Preferably the battery housing and/or frame provides location means for securely locating the one or more batteries, and further preferably the plurality of batteries, in use. In one example the location means includes or consists of two or more spaced apart frame members, and further preferably four spaced apart frame members, between which the batteries are located in use. For example, the frame members can form a cage which hold the batteries in place in use.

Preferably the battery housing and/or frame is arranged to allow the one or more batteries, and further preferably the electrical terminals of the one or more batteries, to be maintained in a horizontal axis, or in an axis parallel or substantially parallel to a longitudinal axis of the roller means in use.

Thus, for example, an axis passing through the centre of each electrical terminal or axis parallel to a longitudinal axis of the electrical terminal is provided parallel or substantially parallel to a longitudinal axis of the roller means when fitted in the roller means in use.

Preferably an aperture is defined in the battery housing and/or frame to allow connection of electrical wiring or cables from the recharging connection means or unit to the one or more batteries.

Preferably connection means are provided for allowing connection of the one or more batteries, the battery housing and/or frame to the internal walls of the roller means in use.

Preferably the connection means can include any or any combination of one or more nuts and bolts, screws, interengaging members, clips, ties, welding, adhesive and/or the like.

Preferably the roller means is any member or members that are able to roll or rotate across a surface, such as for example a ground surface, in use.

In one embodiment the roller means includes one or more roller members.

In one embodiment the roller means consists of a single roller member in a radial direction (i.e. there is no outer roller member and inner roller member as there is with the prior art). The use of a single roller member in a radial direction has allowed the diameter of the roller means to be reduced, thereby allowing the apparatus to be used in more confined spaces, such as on a football pitch where advertising boards are located very close to the pitch edges. It also makes the roller apparatus lighter and less expensive to produce. The provision of a lighter roller member reduces the likelihood of the surface over which the roller member moves in use from being damaged.

The roller means can be formed from any or any combination of material, such as for example, metal, plastic, rubber, wood and/or the like. However, preferably the roller means is formed from a glass reinforced plastic (GRP) material.

Preferably the roller means is in the form of a hollow sleeve member, such as for example a hollow cylindrical sleeve member.

Preferably at least the external shape or cross section of the roller means is circular or substantially circular.

In one example, the outer diameter of the roller means or member is between 320 mm 330 mm.

In one example, the inner diameter of the roller means or member is between 305 mm-315 mm.

In one embodiment the roller means includes two or more roller members joined in an end to end manner to form an elongate roller means.

Preferably joining means and/or a sleeve member are provided to join the two or more roller members together.

Preferably the joining means includes a sleeve member located internally of the two or more roller members, the sleeve member overlapping a portion of the internal walls of each roller member, such as for example at abutting ends of the two adjacent roller members.

In one embodiment a sleeve member is located internally of the roller means to increase the wall thickness and/or to increase the rigidity and strength of the roller means. The sleeve member can be located wholly or partially along the length of the roller means.

Preferably the inner sleeve member can be fixed or sprung (i.e. the resilience of the sleeve member maintains the position of the sleeve member within the roller means).

In one embodiment, the sleeve member, either when it is used for the purposes of strength and rigidity or for joining two or more roller members together, is a split sleeve. This allows the sleeve member to have a degree of resilience to allow it to expand in an outwardly direction once it has been located within the roller means or members. This allows it to provide increased strength and rigidity.

In one example the joining means could include one or more plate members, arm members, bracket members, joining members and/or the like.

Preferably the joining means or sleeve member is fixed to each roller member via fixing means.

Preferably the fixing means are accessible from an exterior of at least one, and preferably both, of the roller members.

Preferably the joining means or fixing means include any or any combination of one or more nuts and bolts, screws, clips, inter-engaging members, welding, adhesive and/or the like.

Preferably the drive means are any means or member that can drive movement or rotation of the roller means, a reaction arm, a torque arm or an external drive arm, directly or indirectly, in use.

In one embodiment the drive means includes at least one motor and/or gearing or a gearbox.

Preferably the motor and/or gearing or gearbox can be provided as a combined unit or two separate units as required.

Preferably the at least one motor is a 24V or 48V alternating current (AC) motor, or other motor compatible with rechargeable batteries, and the power supply for the motor comes from the one or more batteries.

Preferably the gearing or gearbox is provided immediately adjacent the end of the roller means or closer to the end of the roller means to the motor. This is opposite to the arrangement provided in the prior art where the motor is provided at each end of the roller means.

In one embodiment drive means could be provided at or adjacent each end of the roller means.

In one embodiment two sets of motors and gearing are provided in the roller apparatus.

Preferably the gearing and motor are provided in a housing or housings and these housings or housing are further preferably attached to the internal wall of the roller means via the fixing means. The fixing means can be as previously mentioned.

In one embodiment the apparatus includes a reaction arm, a torque arm, bogie, or external drive arm is provided externally of the roller means and is arranged for movement across a surface, such as for example a surface on which the roller is arranged to move, in use.

In one embodiment a single or at least one reaction arm, torque arm bogie or external drive arm is connected to, provided at, adjacent to or associated with an end of the roller means, and preferably the end of the roller means with the gearing or gearbox. However, reactions arms, torque arms, bogies or external drive arms could be provided at both ends of the roller means if required.

Preferably movement of the at least one reaction arm, torque arm, bogie or external drive arm across a ground surface in use is driven directly by the drive means of the apparatus, and further preferably is driven directly by the gearing or gearbox of the drive means.

In one embodiment the roller apparatus consists of only a single reaction arm, torque arm or external drive arm.

Preferably the at least one reaction arm, torque arm, bogie or external drive arm has movement means associated with the same, associated with at least one end of the same and optionally associated with both ends of the arm. For example the arm or bogie could extend forwardly and rearwardly of the roller means and have movement means provided at any one or more points along the length of the same.

In one embodiment the movement means is provided at an end of the arm or bogie opposite to the end of the arm provided at, associated with or connected to the roller means.

Preferably movement of the reaction arm, torque arm, bogie or external drive arm across a surface in use is directly driven from rotational movement generated via the drive means in use.

Preferably a rotatable output shaft of the drive means, gearing or gearbox is connected to the at least one reaction arm, torque arm, bogie or external drive arm. Thus, movement of the reaction arm, bogie, torque arm or external drive arm across a ground surface in use is driven directly from the rotation movement generated via the drive means.

Preferably movement of the reaction arm, torque arm, bogie or external drive arm across a surface drives movement of the roller means in use. This is in contrast to the prior art roller arrangement wherein the drive means drives rotation of the inner and outer roller members directly and this in turn drives movement of a reaction arm across a ground surface in use. For example, in the present invention, the rotation generated by the drive means is transferred in an outwardly direction of the roller member, whereas in the prior art, the rotation generated by the drive means is transferred in an inwardly direction along the roller member.

Preferably the movement means of the reaction arm, torque arm, bogie or external drive arm includes any or any combination of one or more wheels, tyres, drums, rotatable members, skids or feet and/or the like.

Preferably the reaction arm, torque arm, bogie or external drive arm is arranged to be perpendicular or substantially perpendicular to the longitudinal axis of the roller means.

Preferably, the reaction arm, torque arm, bogie or external drive arm is located or arranged laterally of the roller means as the roller means. As the roller means rotates, the arm does not obstruct the pathway of movement of the roller means across a ground surface in use.

In one embodiment two or more reaction arms, torque arms, bogies or external drive arms are provided.

Preferably a cover or cover means are provided on or associated with the roller means in use.

Preferably the cover means are arranged with respect to the roller means such that rotation of the roller means in a first direction allows the cover means to be unwound from around the roller means in use. Preferably rotation of the roller means in a second direction, and preferably opposite direction, to the first direction allows the cover means to be wound around the roller means in use.

Preferably unwinding of the cover means from the roller means allows a surface, and preferably aground surface, to be covered by the cover means in use.

Preferably winding of the cover means onto the roller means allows a surface, and preferably a ground surface, to be uncovered by the cover means in use.

Preferably the cover means is formed from or comprises flexible or substantially flexible material to allow the material to be wound and/or unwound from around the roller means.

In one embodiment the width of the cover means is less than the elongate length of the roller means, thereby allowing access to one or more surfaces of the roller means adjacent one or both ends of the roller means in use. However, the cover means could be equal to or longer in width than the length of the elongate roller means.

In one embodiment the cover means is an integral cover member.

In one embodiment the cover means includes two or more cover portions that are joined or detachably attached to each other to form a cover member. The provision of two or more cover portions that can be joined or detachably attached together allows for a modular cover design.

The attachment means for joining or detachably attaching the cover portions together in use can include any or any combination of one or more nuts and bolts, screws, inter-engaging members, ties, clips, hook and loop fastening (VELCRO®), welding, adhesive and/or the like.

The ground surface that the cover means is designed to cover can include for example, a menage, an arena, a sports pitch, a football pitch, a golf fairway, a putting green, one or more military zones, a remote oil platform helipad, helipad, in any potential hazardous area and/or the like.

Preferably the cover means is formed from waterproof material or include a waterproof coating thereon.

Preferably the cover means is formed from any or any combination of plastic, rubber, fabric, heated electrical cover, waterproof cover, breathable cover and/or the like.

In one embodiment the apparatus includes control means for controlling operation of the roller apparatus.

In one embodiment the control means is arranged to control any or any combination of rotation of the roller means; operation of the apparatus; controlling one or more of the batteries, a reaction arm, torque arm, bogie or external drive means, or the drive means.

In one embodiment the roller apparatus is provided with control means or a control unit for controlling rotation of the roller means in use and/or for moving the apparatus between on and off operational conditions in use. For example, the control means can be used to control rotation of the roller means between a wound position, wherein a cover means is wound around the roller means, and an unwound position, wherein the cover means is partially or wholly unwound from the roller means.

The control means can be provided on, connected to, communicate with and/or be associated with the roller means in a wired or wireless manner.

In one embodiment the control means are located remotely and/or separately from the roller means.

In one embodiment the control means can be included in a steering handle provided on or associated with the roller apparatus.

Preferably one or more user actuation means are provided on or associated with the steering handle and/or control means to allow the apparatus to be moved between on and off operational conditions, the adjust the speed of the roller means, to allow forwards or reverse movement of the roller means and/or the like. For example, the user actuation means can include one or more buttons, switches, dials and/or the like.

Preferably the control means is wireless and includes transmission or communication means for transmitting and/or communicating one or more control signals to one or more components of the apparatus, such as for example the roller means in use.

Preferably the one or more components of the apparatus, such as the drive means, torque arm and/or roller means includes receiver means for receiving one or more control signals from the control means in use.

Preferably communication and/or signal transmission between the control means and one or more components of the apparatus can be one way, or can be two way. In the latter arrangement, one or more transceiver devices can be provided on one or more of the components of the apparatus, the roller means and/or the control means.

In one embodiment receiver means are provided at or adjacent an end of the roller means adjacent where the one or more batteries are located in use.

Preferably a user interface and/or display means is provided at or adjacent the end of the roller means where the one or more batteries are located in use. This can allow a user to see how much charge the batteries may have left, whether the receiver means is operating status of the roller means and/or the like.

Preferably the control means communicates with the roller means via one or more radio frequency signals, infra-red, blue tooth and/or the like.

In one embodiment the control means is software operated via a mobile phone, computer, electronic data processing device, iPad and/or the like.

In one embodiment sensing means are provided on or associated with the roller apparatus to sense one or more conditions pertaining to the roller means, to the drive means, to the batteries, to one or more external environmental conditions, such as the weather and/or the like.

For example, the sensing means could include speed sensing means to detect the speed of rotation of the roller means in use, temperature sensing means to detect the environmental conditions in the locality in which the roller apparatus is being used and/or the like.

Preferably the sensing means could include optical means, such as one or more cameras, infra-red signals and/or the like.

In one embodiment the roller apparatus is self-deployable, such as for example when one or more sensed conditions are met due to one or more environmental conditions that are sensed via the sensing means and/or for any other reason, such as at a certain time of day and/or the like. In one embodiment the roller apparatus is user-deployable.

The roller apparatus can be deployed with or without user assistance. For example, the apparatus can be self-steering or it can require one or more users to guide movement of the roller means In one embodiment one or more tracks or guide means could be provided to allow at least part of the apparatus, such as for example the movement means of the reaction arm, to move in the same in use. This helps to guide the rotation of the roller means in use, thereby removing or reducing the number of operators that may be required to ensure smooth and safe deployment of the roller apparatus in use.

For example, one or more track or guide means could be provided on or adjacent a surface over which the roller apparatus is to move in use and/or over which the cover means is to be deployed in use. The track or guide means can be surface mounted or can be recessed in the surface so as not to represent a tripping hazard.

In one embodiment two or more roller apparatus can be used in a side by side, overlapping and/or end to end manner to allow coverage of a larger area than use of a single roller apparatus alone.

Preferably the roller means has at least one internal cavity defined therein and further preferably the entire roller means is hollow in one embodiment.

Preferably a detachably attachable end cover can be provided on one or both open ends of the roller means.

Preferably the interior of the roller means has sealing means to allow the interior to be sealed or substantially sealed from the external environmental conditions. For example, one or more seals, gaskets, O-rings and/or the like can be provided.

In one embodiment one or more ends of the roller means is provided with an attachment for allowing attachment of a steering device or hook therewith in use. The steering device or hook allows an operator to help guide the winding and unwinding of the cover from the roller apparatus in use.

Preferably the attachment can include a rotatable or pivotable attachment member, a swivel eye, rotating bearing, rigid steering pole, integrated hook member and/or the like.

In one embodiment the steering device includes a steering cable, steering strap, an inertia reel and/or a retractable inertia reel. For example, a steering device could be provided mounted on or housed within the external drive arm, torque arm or reaction arm.

In one example, the steering device, steering cable, steering strap or inertia reel are provided on or associated with the steering handle.

In one embodiment the roller apparatus of the present invention is considered to be a wireless apparatus in that there is no requirement for any external electrical cables or wires to allow operation of the roller apparatus. This is in contrast to the prior art roller apparatus which is a wired apparatus in that there is a requirement for external electrical cables or wires to be present in order to allow operation of the roller apparatus.

In one embodiment one or more inflatable means, skids or air skates are provided to raise the roller means off a surface in use to allow it to be moved and/or to allow adjustment of cover means in use.

According to a second aspect of the present invention there is provided a method of using roller apparatus, said roller apparatus including roller means, drive means, and an electrical power source, said method including the steps of providing electrical power to the drive means using the electrical power source, and driving rotation of the roller means via the drive means to allow movement of the roller means across a surface, and wherein said electrical power source is provided by one or more batteries located internally of the roller means.

According to further independent aspects of the present invention there is provided a roller operated cover system and/or a method of using a roller operated cover system.

Thus, the present invention provides a stand-alone, modular roller apparatus or roller operated cover system that is internally powered and can be controlled remotely if required. The roller apparatus of the present invention can be used without operators being present or with a reduced number of operators being present. The apparatus is simpler in design and more cost effective to produce and use. It is also significantly lighter in weight than the prior art roller system so is unlikely to damage the surface over which the apparatus is being moved or rolled over.

Embodiments of the present invention will now be described with reference to the following figures, wherein.

Referring to FIGS. 2a-5c, there is illustrated battery powered roller apparatus 102 according to an embodiment of the present invention. The roller apparatus 102 includes a single roller member 104 provided in a radial direction. Two or more roller members 104, 104' can be joined together via an internal joining sleeve 105 in an end to end manner in a longitudinal direction if required to achieve a desired overall total length for the roller apparatus.

The roller member 104 is elongate and hollow to allow one or more drive components and internal electrical power source components or batteries to be provided therein.

The roller member 104 has a first end 106 and a second opposite end 108. Drive means 110 are provided at the first end 106 and a plurality of batteries 112 are provided at the second end 108.

A reaction arm 114 is provided at first end 106. The reaction arm 114 is provided with a wheel 116 that rotates along a ground surface during deployment of the roller apparatus in use. The wheel 116 is provided at an end 118 of the reaction arm 114.

The drive means 110 includes a combined motor and a gearbox unit 120. Although the motor and gearbox are shown in the images as a combined unit, they could be provided as separate units if required. The motor and gearbox 120 are provided in a housing 122 that is fixed to the interior walls of the roller member 104 via fixing means in the form of a plurality of bolts 124. These bolts 124 are accessible from the exterior of the roller member 104 to allow the housing 122 to be attached and detached from the roller member to allows its fitting or removal respectively for replacement and/or repair.

Figure 1A:
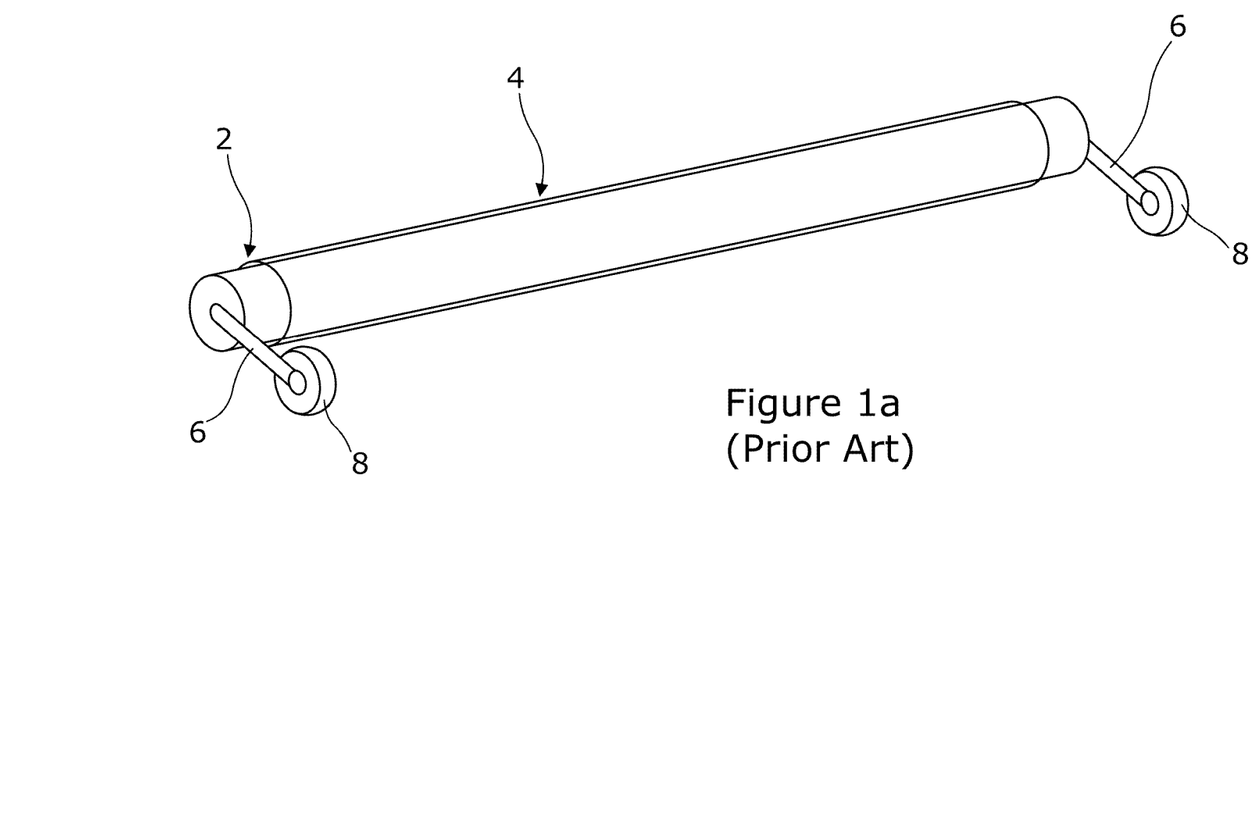
FIGS. 1a-1d (PRIOR ART) show a perspective view, a partially transparent view of the inner roller member with fittings, a partial view of the drive means of the roller and an exploded view of the drive means of the roller respectively for an existing externally powered roller system.
Figures 1B, 1C:
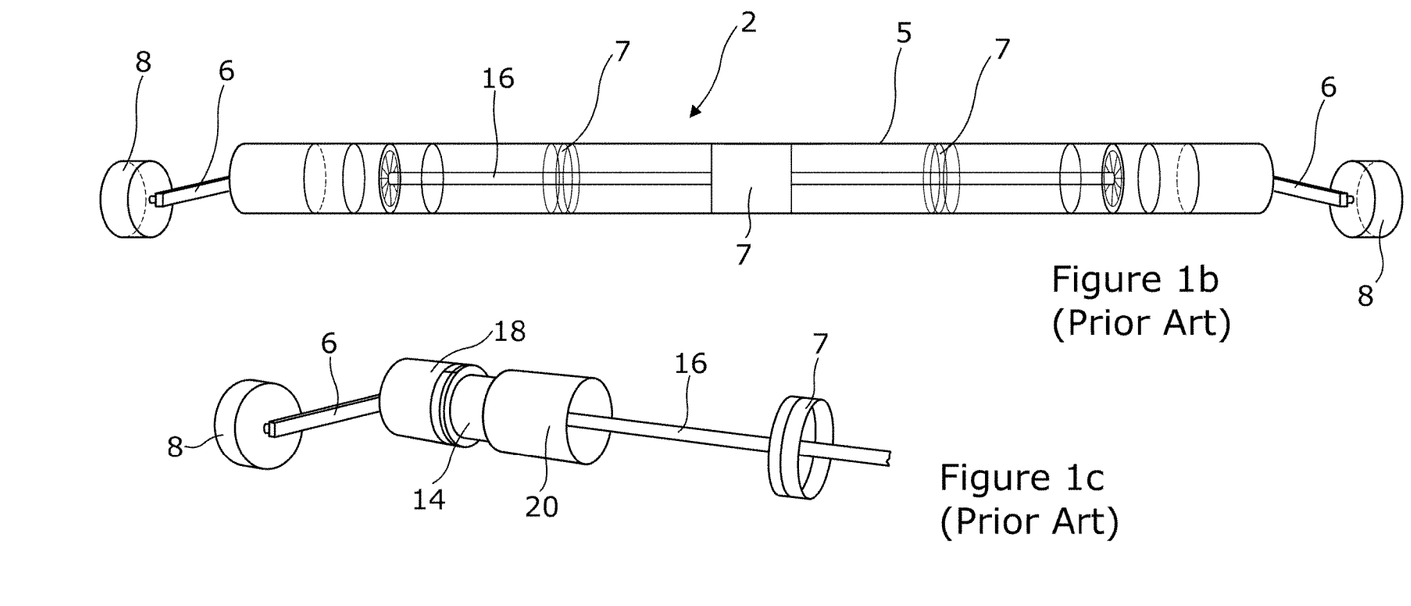
Figure 1D:
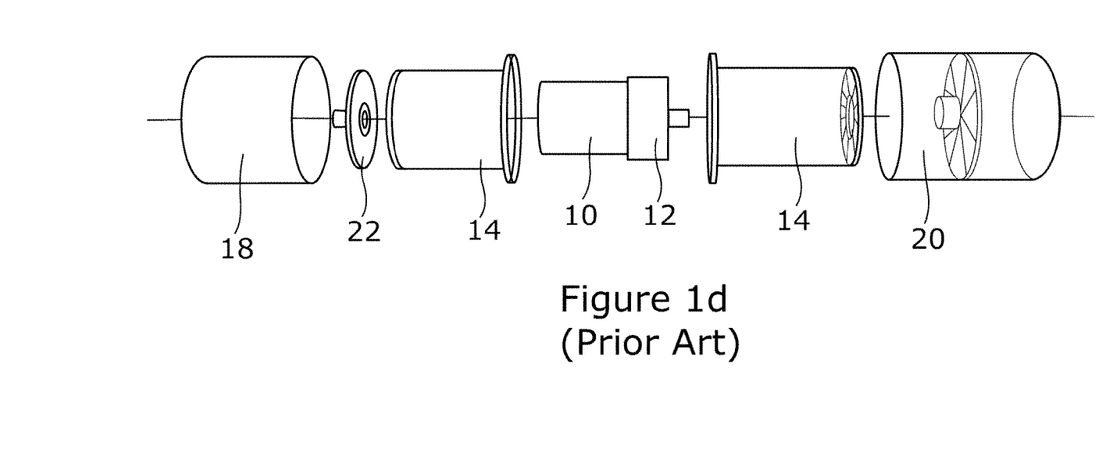
Figure 2A:
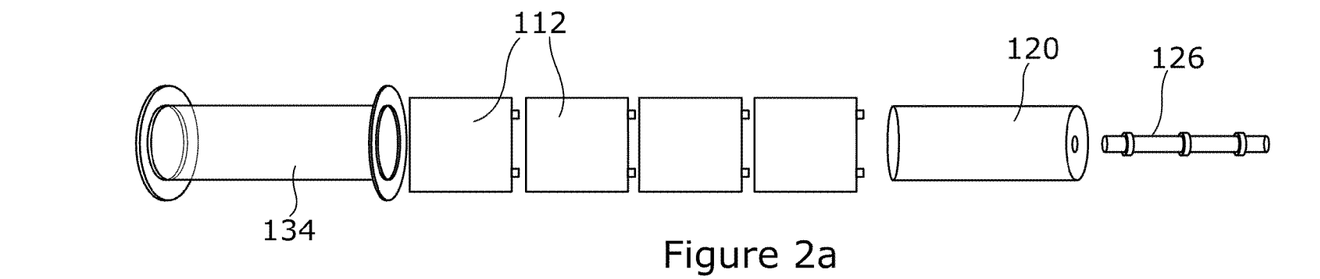
FIGS. 2a-2c show an exploded view of the main internal workings of the roller apparatus according to an embodiment of the present invention, a view of FIG. 2a with the drive means provided in an external housing, and the view of FIG. 2b in a roller member respectively.
Figure 2B:
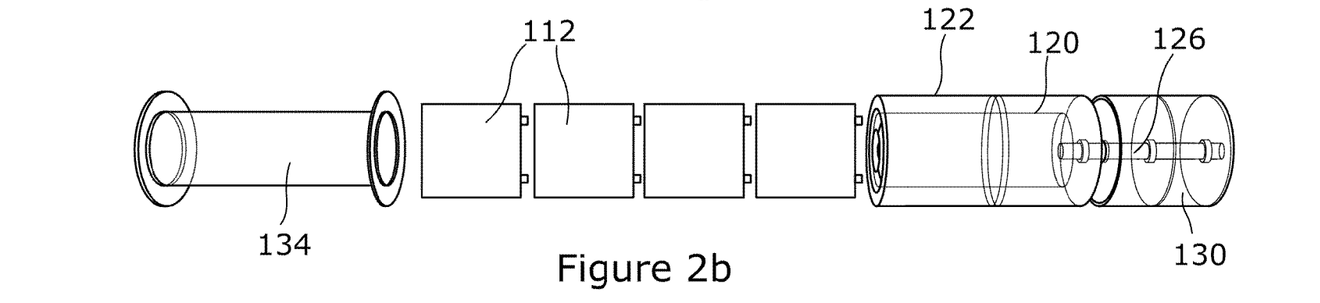
Figure 2C:
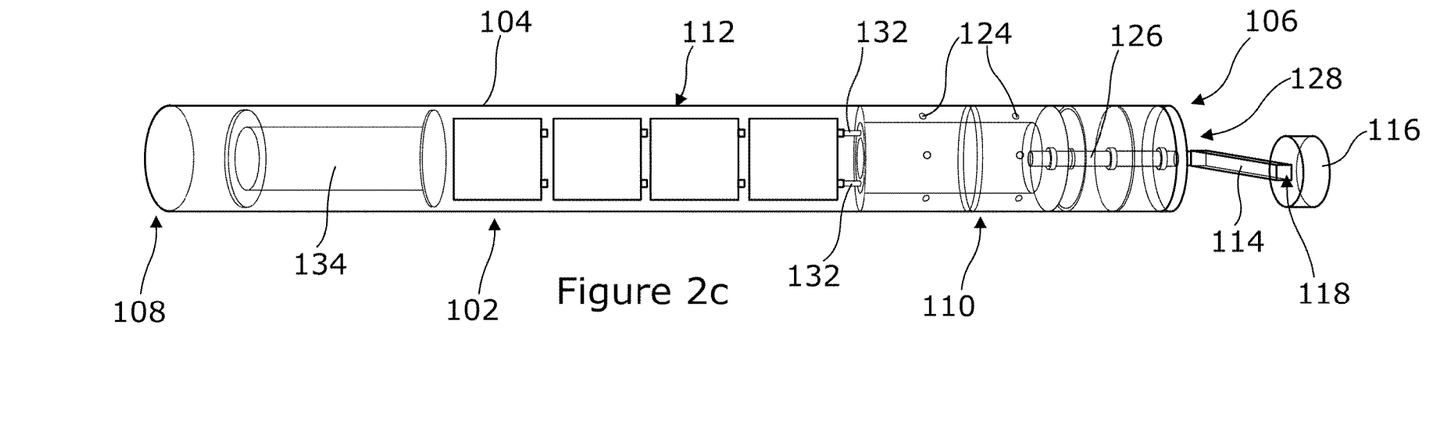

The output shaft 126 of the gearbox unit 120 faces towards first end 106 and is joined to the end 128 of reaction arm 114. Thus, the output shaft 126 of gearbox 120 drives rotation of the reaction arm 114 and wheel 116 directly in use. This in turn drives rotation of the roller member 104 across a ground surface in use. The output shaft 126 can optionally be provided in an output sleeve 130 if required, as shown in FIGS. 2a-2c (but which is absent from FIGS. 5a-5d). The output sleeve 130 can be joined to the roller member 104 via bolts 124.

The batteries 112 are connected to the motor unit 120 via electrical cables 132 provided internally of the roller member 104. The batteries 112 rotate with the roller member 104 in use. The batteries are typically of a rechargeable type.

Although four batteries 112 are shown in the illustrations, it will be appreciated that the number, size, position and/or power of the batteries can be adjusted as required. A control unit 134 is typically provided between the end of the batteries 112 and the end 108 of the roller member 104 in FIGS. 2a-2d, but does not have to present as shown in FIGS. 5a-5d.

Figures 3A, 3B:
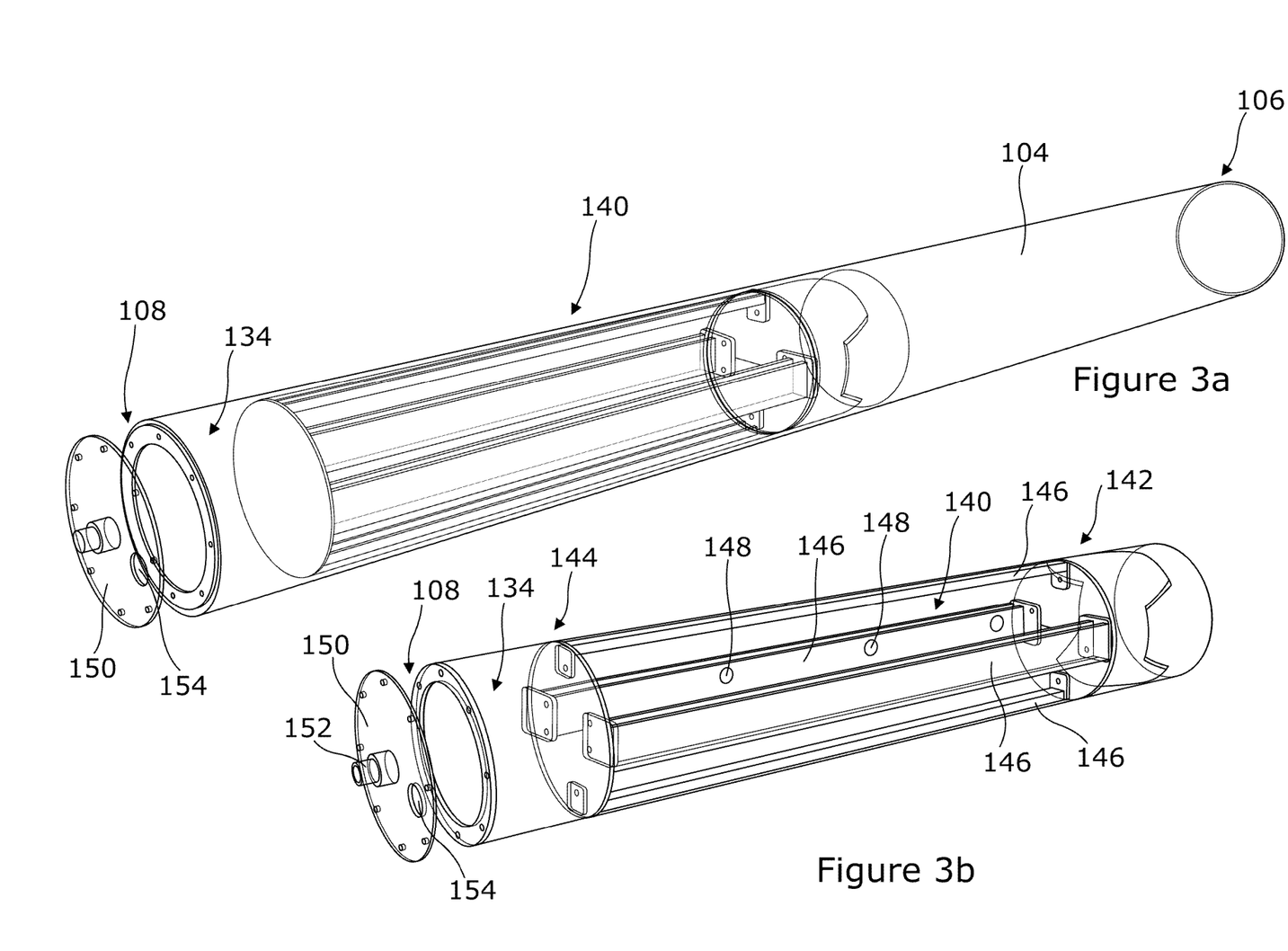
FIGS. 3a and 3b show an example of a battery housing according to an embodiment of the present invention located in a roller member; and the battery housing of FIG. 3a respectively.

The batteries can be provided in a housing 140, as shown in FIGS. 3a-3b, for location in the interior hollow space of the roller member 104 in use. In one example, the housing 140 has an overall cylindrical outer shape having a first end 142 for insertion into the roller member 104 and a second end 144 for location adjacent the control means 134 in use. The housing comprises four elongate frame members 146 provided between the first and second ends 132, 244. The frame members 146 define a hollow cage therebetween for location of and maintaining the position of the batteries 112 in use. Each battery is typically arranged to be held in a position such that a longitudinal axis of the electrical terminals are horizontal or parallel to the longitudinal axis of the roller member. This prevents the batteries from being stored in an inverted position in use, which may cause damage to the batteries over extended time periods.

The housing 140 can be slid into and out of the hollow interior of the roller member 104 in use. Fixing means in the form of bolts can be used to fix the battery housing 140 via apertures 148 defined in the frame members 146 to the interior walls of the roller member 104 in use.

The control unit 134 can house one or more components necessary for control of the batteries, and thus the motor/gearbox unit 120 in use. A removable end cover 150 can be provided to close the hollow interior of the roller member 104 at end 108 thereof. A similar end cover can be provided to cover the opposite end of the roller member if required. A plurality of bolts or screws can be used to attach the cover 150 to the roller member 104 in use.

An attachment 152 can be provided on end cover 150 to allow attachment of a steering hook (not shown) in use to help guide movement of the roller member during deployment. A display screen 154 can be provided in end cover 150 to allow one or more operational parameters of the batteries to be viewed by a user.

Figure 4:
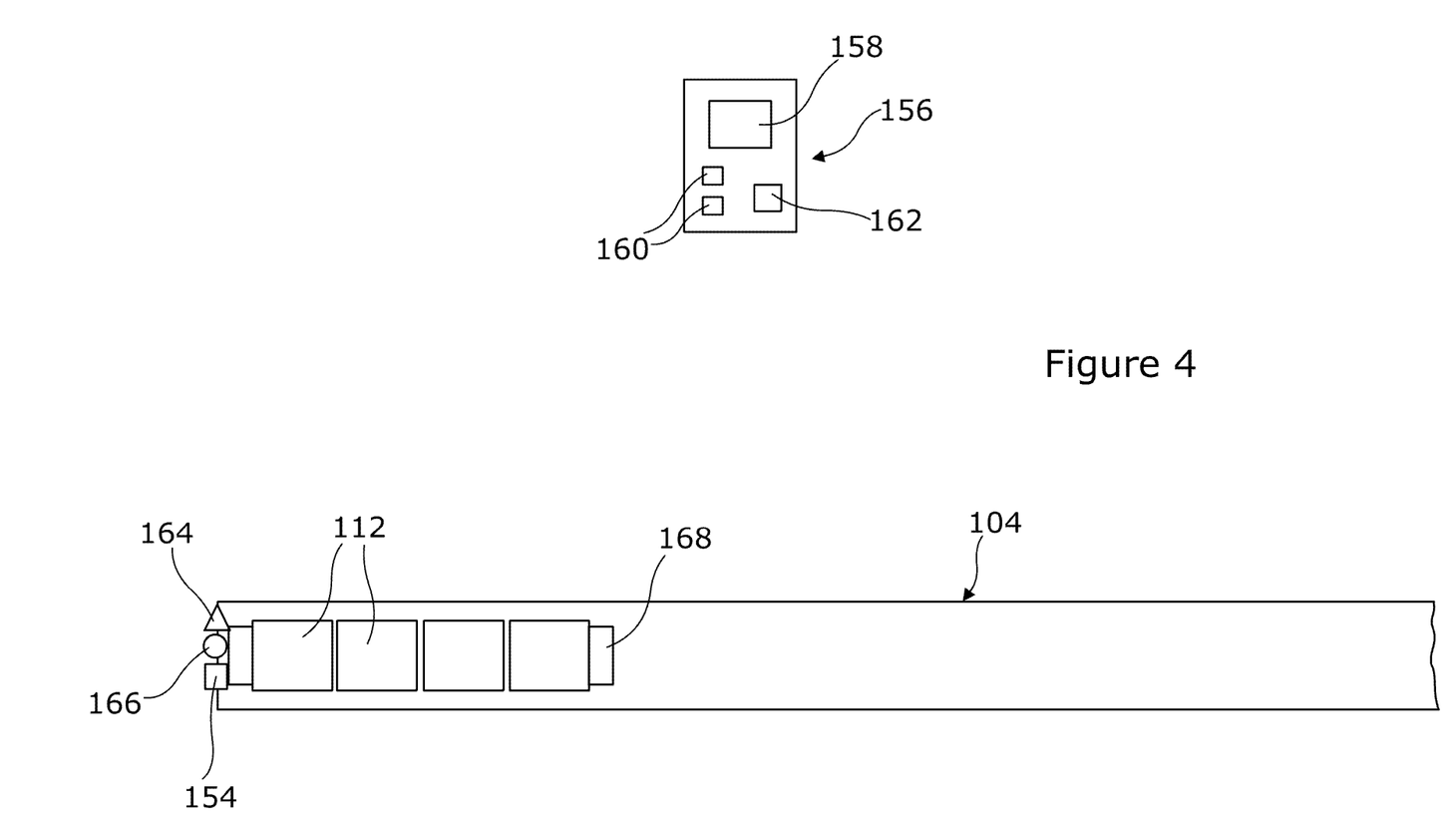
FIG. 4 is a simplified view of the control means and receiving end of the roller means according to one embodiment of the present invention.
Figure 5A:
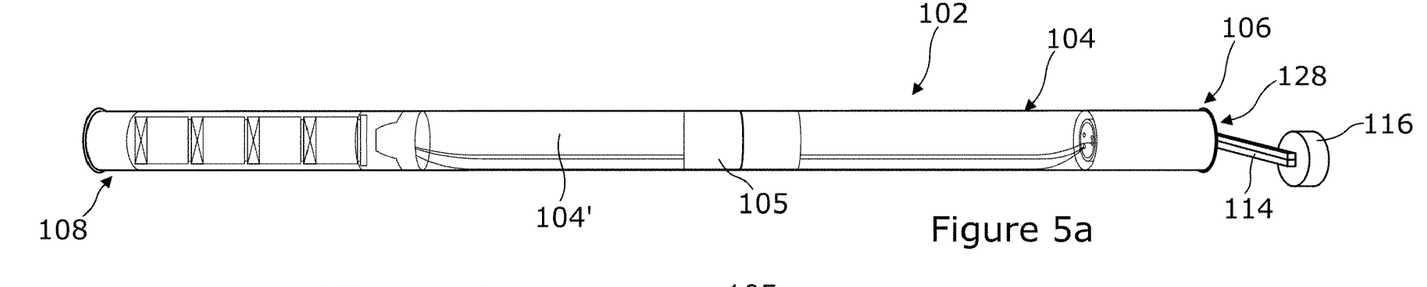
FIGS. 5a-5d show a fully assembled view of roller apparatus according to an embodiment of the present invention, a view of FIG. 5a without the roller member present; a view of FIG. 5b without the battery housing, drive means housing or joining sleeve present; and an end view of the fully assembled roller apparatus.
Figures 5B, 5C:
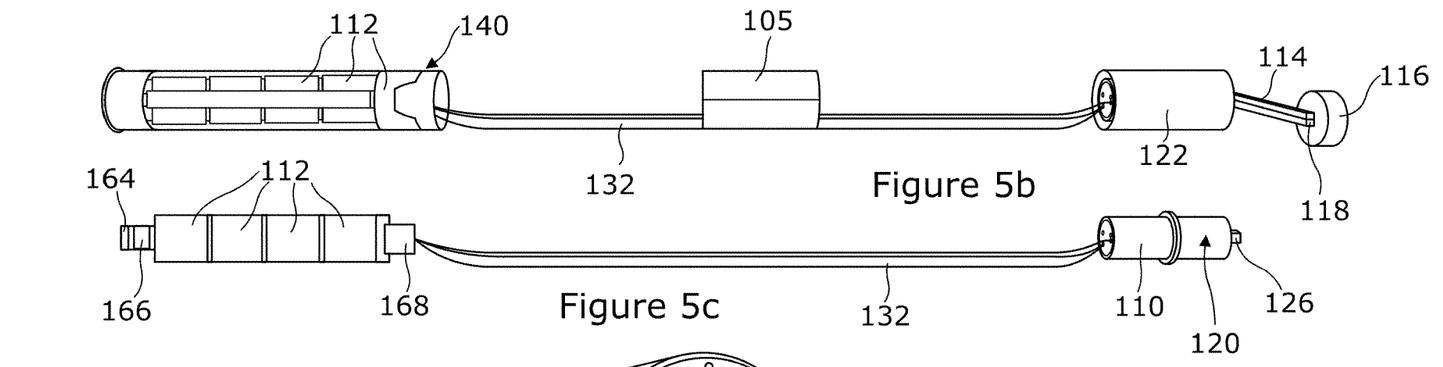
Figure 5D:
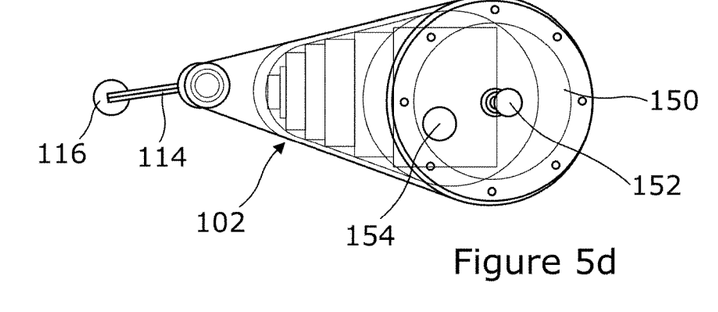

The roller apparatus 102 of the present invention can be operated remotely if required using a hand held remote control device 156, as shown in FIG. 4. Alternatively the control device can be fixed and located adjacent the roller apparatus 102 if required. The device 156 can include a display screen 158 for visually displaying one or more operational parameters of the roller apparatus to a user, control buttons 160 for moving the roller apparatus between on and off operational conditions, for controlling the direction of movement of the roller member 104 in use and/or the like. A transmitter or transceiver 162 can also be provided on the device 156 to allow one or more control signals to be communicated to and/or received from the control unit 134 of the roller member 104.

The control unit 134 includes a receiver or transceiver 164 for receiving and/or transmitting one or more control signals to the control device 156 in use, a battery recharge connection 166 to allow recharging of the batteries 112 contained within the roller member 104, and display screen 154. A DC to AC inverter 168 is associated with batteries 112 to convert the electrical charge to AC for use by the motor 120.

A cover member can be provided with the roller apparatus in use for movement between a wound condition, wherein the cover member is partially or wholly wound around the roller member in an overlapping arrangement, and an unwound condition, wherein the cover member is partially or wholly unwound from the roller member. In the unwound condition, the cover member can be used to cover a ground surface in use to protect the same from rain, snow, frost, pedestrians, vehicles and/or the like.

Figures 6A, 6B, 6C:
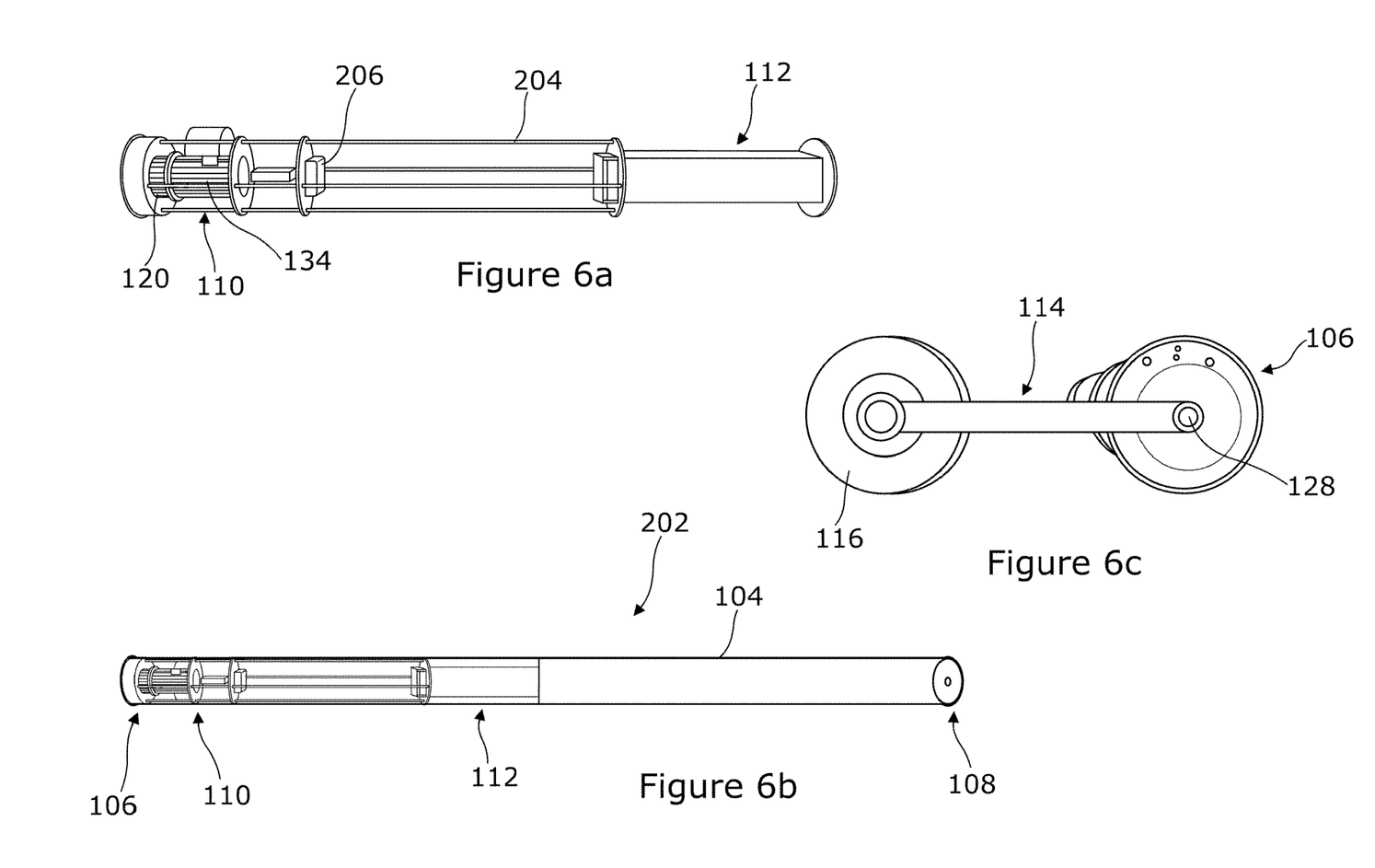
FIGS. 6a-6c show some of the interior components of the roller member according to one embodiment of the present invention, the interior components located within the roller member, and a reaction arm for use with the roller member in FIGS. 6a-6b in one example.

Referring to FIGS. 6a-6c, a further embodiment of roller apparatus 202 is illustrated where the batteries 112 are not located at the opposite end of the roller apparatus to the motor and gearbox 110, 120 but are located a spaced distance apart and substantially centrally of the roller member 104. This allows better distribution of weight compared to the if the batteries were immediately adjacent the motor and gearbox. A frame 204 can be provided to maintain the batteries a spaced distance apart from the motor and gearbox. A radio receiver 206 can be provided in the apparatus to receive one or more control and/or data signals from the control means in use.

The invention claimed is:

1. Roller apparatus for rolling in and/or out a ground cover, said roller apparatus including roller means in the form of a roller member or roller members that are able to roll or rotate across a surface in use, drive means for driving rotation of the roller means in use, and an electrical power source for providing electrical power to the drive means in use, wherein said electrical power source is provided by one or more batteries or one or more rechargeable batteries located internally of the roller means; the drive means includes at least one motor and gearing provided internally of the roller means, wherein the gearing is provided closer to an end of the roller means than the at least one motor; and the apparatus includes at least one reaction arm, at least part of which is provided externally of the roller means and is arranged for movement across the surface in use; and wherein the at least one reaction arm is provided at the end of the roller means which is the same end as where the drive means is provided; a rotatable output shaft of the gearing is connected to the at least one reaction arm and is arranged so that movement of the at least one reaction arm across the surface in use is driven directly from the rotation movement generated via the drive means; and wherein movement of the at least one reaction arm across the surface drives movement of the roller means across the surface in use.

2. Roller apparatus according to claim 1 wherein the electrical power source comprises the one or more rechargeable batteries, and wherein the apparatus includes recharging connection means and/or a recharging unit which is/are connected to, connectable to and/or associated with the one or more rechargeable batteries to allow the one or more rechargeable batteries to be recharged via a further electrical power source in use.

3. Roller apparatus according to claim 1 wherein the electrical power source comprises the one or more batteries, and wherein the one or more batteries are provided at, immediately adjacent or adjacent a first end of the roller means, and the drive means are provided at, immediately adjacent or adjacent the end which is a second end of the roller means; and wherein the one or more batteries are connectable to the drive means via one or more electrical cables that extend internally of the roller between the batteries and the drive means.

4. Roller apparatus according to claim 1, wherein the electrical power source comprises the one or more batteries, and wherein an inverter is provided with or associated with the one or more batteries for converting Direct Current (DC) electrical power supplied by the batteries to Alternating Current (AC), or vice versa, for use by the drive means.

5. Roller apparatus according to claim 1 wherein the electrical power source comprises the one or more batteries, and wherein the one or more batteries are removably located in a battery housing, a frame or the roller means in use; and wherein the battery housing and/or frame is movably and/or slidably mounted within an internal cavity of the roller means in use.

6. Roller apparatus according to claim 5 wherein the electrical power source comprises the one or more batteries, and wherein the battery housing and/or frame is arranged to allow the one or more batteries and/or electric terminals of the one or more batteries, to be maintained in a horizontal axis or in an axis parallel or substantially parallel to a longitudinal axis of the roller means in use; and/or wherein connection means are provided to allow connection of the one or more batteries, the battery housing and/or frame to internal walls of the roller means in use.

7. Roller apparatus according to claim 1 wherein the roller means comprises a single roller member in a radial direction; or two or more roller members joined together in an end to end manner to form an elongated roller means, with joining means and/or a sleeve member provided to join the two or more roller members together in use.

8. Roller apparatus according to claim 1 wherein the roller means is a hollow sleeve member or hollow cylindrical sleeve member.

9. Roller apparatus according to claim 1 wherein movement of the at least one reaction arm, torque arm, bogie or external drive arm across a surface in use is directly driven from rotational movement generated by the drive means in use; and/or wherein movement of the at least one reaction arm, torque arm, bogie or external drive arm across a surface in use drives movement of the roller means in use.

10. Roller apparatus according to claim 1 wherein the at least one reaction arm, torque arm, bogie or external drive arm is arranged to be perpendicular or substantially perpendicular or laterally to a longitudinal axis of the roller means in use.

11. Roller apparatus according to claim 1 wherein cover means are provided on or associated with the roller means in use, said cover means arranged with respect to the roller means such that rotation of the roller means in a first direction allows the cover means to be unwound from the roller means in use, and rotation of the roller means in a second direction allows the cover mans to be wound around the roller means in use.

12. Roller apparatus according to claim 1 wherein the electrical power source comprises the one or more batteries, and wherein the apparatus includes any or any combination of control means for controlling operation of the roller apparatus; a user interface and/or display means provided at or adjacent second end of the roller means; sensing means for sensing one or more conditions pertaining to the roller means, to the drive means, to the one or more batteries and/or to one or more external environmental conditions, and wherein the apparatus is self-deployable when one or more conditions sensed by the sensing means are met; or sealing means are provided to allow the interior of the roller means to be sealed or substantially sealed from external environmental conditions in use.

13. Roller apparatus according to claim 1 wherein the at least one reaction arm, torque arm, bogie or external drive arm has movement means associated with at least one end of the same.

14. Roller apparatus according to claim 1 wherein the at least one reaction arm, torque arm, bogie or external drive arm has movement means associated with an end of the arm or bogie opposite to the end of the arm provided at, associated with or connected to the roller means.

15. A method of using a roller apparatus for rolling in and/or out a ground cover according to claim 1; said method including the steps of providing electrical power to the drive means using the electrical power source, and driving rotation of the roller means via the drive means to allow movement of the roller means across a surface,.

\* \* \* \* \*